United States Patent
Pobanz (10) Patent No.: US 8,948,608 B1
(45) Date of Patent: Feb. 3, 2015

(54) DIRECT-COUPLED DRIVER FOR MACH-ZEHNDER OPTICAL MODULATORS

(71) Applicant: Inphi Corporation, Santa Clara, CA (US)

(72) Inventor: Carl Pobanz, Santa Clara, CA (US)

(73) Assignee: Inphi Corporation, Santa Clara, CA (US)

( * ) Notice: Subject to any disclaimer, the term of this patent is extended or adjusted under 35 U.S.C. 154(b) by 134 days.

(21) Appl. No.: 13/831,076

(22) Filed: Mar. 14, 2013

Related U.S. Application Data (60) Provisional application No. 61/706,217, filed on Sep. 27, 2012.

(51) Int. Cl.
*H04B 10/04* (2006.01)
*G02F 1/01* (2006.01)

(52) U.S. Cl.
CPC .................................. *G02F 1/011* (2013.01)
USPC ........... 398/183; 398/192; 398/193; 398/195; 398/198

(58) Field of Classification Search
CPC ........... H04B 10/516; H04B 10/59595; H04B 10/50593
USPC ........ 398/141, 164, 183, 192, 193, 194, 195, 398/198, 200
See application file for complete search history.

(56) References Cited

U.S. PATENT DOCUMENTS

| | | | | |
|---|---|---|---|---|
| 5,359,449 A | * | 10/1994 | Nishimoto et al. | 398/198 |
| 6,872,966 B2 | * | 3/2005 | Akiyama et al. | 257/14 |
| 7,266,306 B1 | * | 9/2007 | Harley et al. | 398/182 |
| 2005/0105917 A1 | * | 5/2005 | Narusawa et al. | 398/183 |
| 2008/0094123 A1 | * | 4/2008 | Koh et al. | 327/513 |
| 2012/0082465 A1 | * | 4/2012 | Akiyama et al. | 398/158 |

* cited by examiner

*Primary Examiner* — Dalzid Singh
(74) *Attorney, Agent, or Firm* — Richard T. Ogawa; Ogawa P.C.

(57) ABSTRACT

An optical modulator device directly-coupled to a driver circuit device. The optical modulator device can include a transmission line electrically coupled to an internal VDD, a first electrode electrically coupled to the transmission line, a second electrode electrically coupled to the first electrode and the transmission line. A wave guide can be operably coupled to the first and second electrodes, and a driver circuit device can be directly coupled to the transmission line and the first and second electrodes. This optical modulator and the driver circuit device can be configured without back termination.

20 Claims, 9 Drawing Sheets

DIRECT-COUPLED DRIVER FOR MACH-ZEHNDER OPTICAL MODULATORS

CROSS-REFERENCES TO RELATED APPLICATIONS

This non-provisional patent application claims priority from U.S. Provisional Patent Application No. 61/706,217, filed Sep. 27, 2012, which is incorporated by reference herein for all purposes.

BACKGROUND OF THE INVENTION

The present invention is directed to data communication system and methods.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, there have been many types of communication systems and methods. Unfortunately, they have been inadequate for various applications. Therefore, improved communication systems and methods are desired.

BRIEF SUMMARY OF THE INVENTION

The present invention is directed to data communication system and methods. More specifically, various embodiments of the present invention provide a direct coupled driver device for an optical modulator device, which can be a Mach-Zehnder Modulator (MZM) and the like. The driver device can be configured with an optical modulator within an optical network for high-speed signal transfer.

The present driver is used for optical communications links. It produces the electrical signal that drives an optical modulator device. The optical modulator transfers variations of the electrical signal into corresponding modulation of an optical signal parameter such as amplitude, phase, polarization or a combination of these, in order to convey information on an optical wave such as one traveling through an optical fiber. The electrical "modulator driver" circuit is an important electronic component since all of the data to be conveyed optically has to pass through this electrical device, which typically requires it to operate at the highest speed or data rate of any electrical component in the communication system. In addition, the driver must produce an electrical amplitude that is typically large relative to other data signals in the system, due to the weakness of the electro-optical effects that are used in high-speed optical modulators. This makes the modulator driver a major contributor to power dissipation in the system, and puts a premium on techniques to reduce this power.

In an embodiment, the optical modulator device can include signal conductor electrodes connected to electrical transmission lines. For example, there can be an upper signal conductor electrode and a lower signal conductor electrode, the upper signal conductor electrode and the lower rectangle being the similar electrode that is the return path for this current. These two conductors could form a microstrip line, a coplanar waveguide (CPW), parallel plates, or some other transmission line. The electric field from this electrical "RF" signal is concentrated between these plates, where it interacts on the optical waveguide (shown in dotted lines) to produce the modulation effect in the modulator material where the "RF" and optical fields overlap. The transmission lines can include a horizontal "CPW" transmission line or vertical "coplanar strips", and the like. The electric field exists between the signal + and signal − electrodes for a "differential" structure, or between a signal electrode and ground for a "single ended" structure.

A feature of the present is that there is no back-termination $R_T$. Therefore, the load R seen by the driver is just the load resistance $R_L$. $R_L$ serves the same function in all examples: it is the termination to the transmission lines inside the optical modulator. The back-termination is generally used so that the driver has a good impedance match to a 50 ohm line, which is the usual way of connecting a driver and a modulator since they are traditionally designed as separate items. However, the line between them may be long, multi-sectioned, or involve vias or connectors, etc., all of which can add reflections. If the driver does not have a back termination, these reflections can bounce back and degrade the signal. If the driver is designed to be interfaced directly to the modulator, as here, this problem can be eliminated; the modulator termination/load resistor may also be used as an input point for the driver power supply ($V_{DD}$).

A simplified schematic of the direct coupled driver includes the basic functioning of a bias control loop. The goal of the bias control loop is to keep a DC voltage equal to $V_{MOD}$ applied across the modulator electrodes at all times. This is useful in semiconductor-based MZ modulators in which the electro-optic modulation effect occurs or is maximized at a specific DC bias; for example, where the electrode comprises a reverse-biased diode. The $V_{MOD}$ voltage is the resulting DC voltage across each electrode. For the typical case of a DC-balanced data signal, $V_{MOD}$ can be considered to be the average DC voltage on Vrf+ and Vrf− (e.g. the common-mode voltage at the driver output terminals) minus the DC voltage on the opposite terminals of these respective MZM electrodes. So, as the DC voltages at the Vrf+ and Vrf− pads vary due to supply voltage $V_{DD}$ changing, or drive current changing, etc., the control loop keeps the DC voltage across the electrodes constant. Thus, $V_{MOD}$ serves as the bias point for the optical modulator function, with the AC modulation voltage riding on top. In practice there are a number of op-amp circuits that would perform this function.

In an embodiment, the present invention provides an optical modulator device directly-coupled to a driver circuit device. The optical modulator device can include a transmission line electrically coupled to an internal VDD, a first electrode electrically coupled to the transmission line, a second electrode electrically coupled to the first electrode and the transmission line. A wave guide can be operably coupled to the first and second electrodes, and a driver circuit device can be directly coupled to the transmission line and the first and second electrodes. This optical modulator and the driver circuit device can be configured without back termination.

It is to be appreciated that embodiments of the present invention provide numerous benefits and advantages over existing techniques. In an embodiment, the electrical driver is directly coupled to the modulator device or MZM, which can include a wire-bonded or flip-chipped application directly to a photonic circuit without transmission line interconnects. The driver can receive its power supply for the output stage through the modulator termination resistors. This configuration can eliminate the need for back termination at the driver, which saves power (e.g. >40%). Also, the need for bias tees or DC blocks between driver and modulator can be eliminated, which saves area (e.g. >100%). Furthermore, this configuration can allow a versatile drive capability, since the exact impedance of the modulator load is not critical to signal quality. The DC bias of the modulator can also be configured with a bias control loop. There are many other benefits as well.

DETAILED DESCRIPTION OF THE INVENTION

The present invention is directed to data communication system and methods. More specifically, various embodiments of the present invention provide a direct coupled driver device for an optical modulator device, which can be a Mach-Zehnder Modulator (MZM) and the like. The driver device can be configured with an optical modulator within an optical network for high-speed signal transfer.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM8, PAM12, PAM16, etc.) in leaf-spine architecture that allows large amount (up terabytes of data at the spine level) of data to be transferred via optical network.

Figure 1:
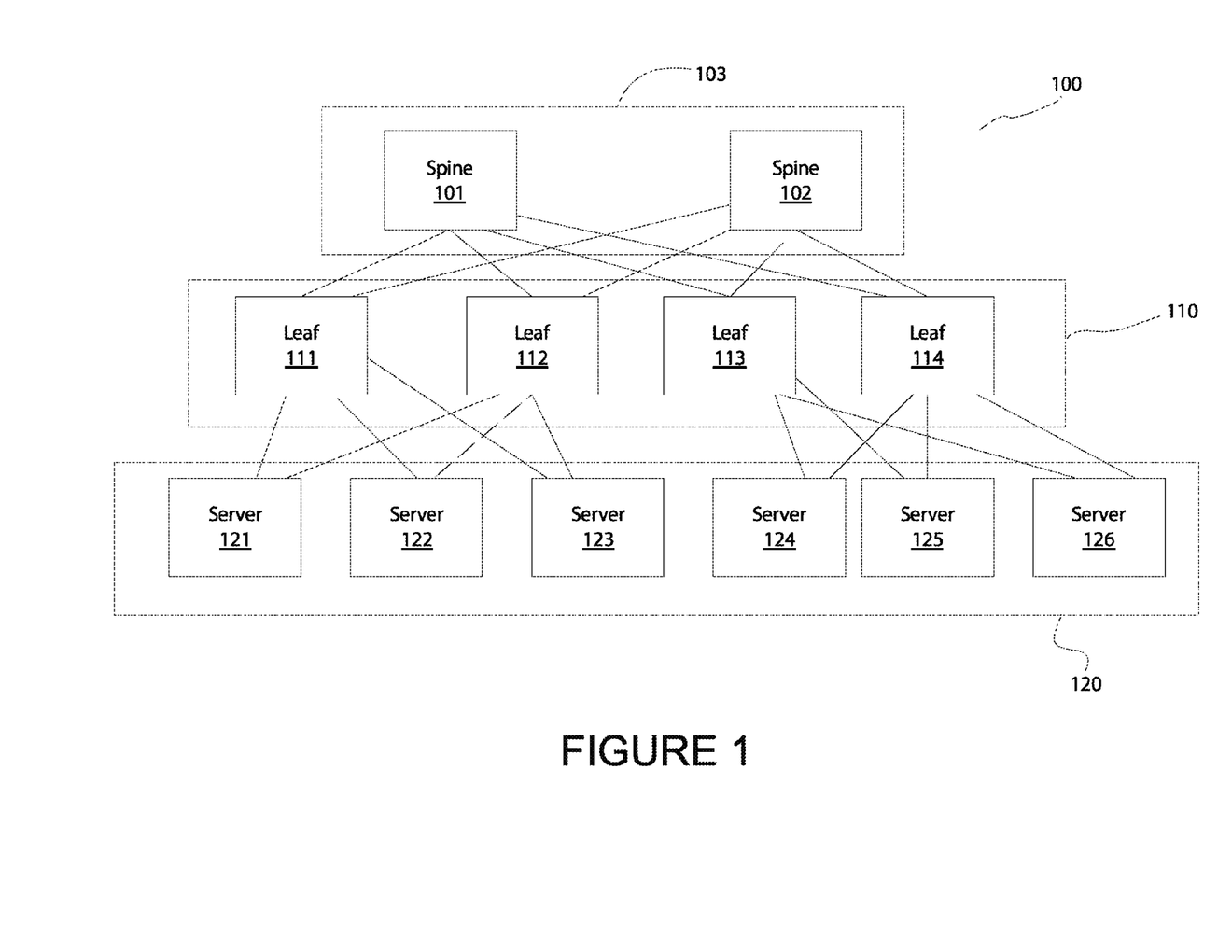
FIG. 1 is a simplified diagram illustrating a leaf-spine architecture according to an embodiment of the present invention.

FIG. 1 is a simplified diagram illustrating a leaf-spine architecture 100 according to an embodiment of the present invention. This diagram is merely an example, which should not unduly limit the scope of the claims. One of ordinary skill in the art would recognize many variations, alternatives, and modifications. The leaf-spine architecture 100 comprises servers 120, leaf switches 110, and spine switches 103. It is to be appreciated that depending on the need and specific application, the number and arrangement of the servers and switches may be changed. As shown in FIG. 1, each server may be connected to more than one leaf switch. For example, server 121 is connected to leaf switches 111 and 112. Similarly, server 122 is connected to leaf switches 111 and 112, and so is server 123. In an exemplary embodiment, server 121 is connected to the leaf switch 111 via optical communication link utilizing pulse amplitude modulation (PAM). PAM2, PAM4, PAM8, PAM12, PAM16, and/or other variations of PAM may also be used in conjunction with optical communication links in various embodiments of the present invention. The bandwidth of the optical communication link between the server 121 and leaf switch 111 can be over 10 gigabits/s. Each leaf switch, such as leaf switch 111, may be connected to 10 or more servers. In one implementation, a leaf switch has a bandwidth of at least 100 gigabits/s.

In a specific embodiment, a leaf switch comprises a receiver device configured to receive four communication channels, and each of the channels is capable of transferring incoming data at 25 gigabits/s and configured as a PAM-2 format. Similarly, a server (e.g. server 121) comprises communication interface that is configured to transmit and receive at 100 gigabits/sec (e.g., four channels at 25 gigabits/s per channel), and is compatible with the communication interface of the leaf switches. The spine switches, similarly, comprise communication interfaces for transmitting and receiving data in PAM format. The spine switches may have a large number of communication channels to accommodate a large number of leaf switches, each of which provides switching for a large number of servers.

The leaf switches are connected to spine switches. As shown in FIG. 1, each leaf switch is connected to spine switches 101 and 102. For example, leaf switch 111 is connected to the spine switch 101 and 102, and so are leaf switches 113 and 114. In a specific embodiment, each of the spine switches is configured with a bandwidth of 3.2 terabytes/s, which is big enough to communicate 32 optical communication links at 100 gigabits/s each. Depending on the specific implementation, other configuration and bandwidth are possible as well.

The servers, through the architecture 100 shown in FIG. 1, can communicate with one another efficiently with a high bandwidth. Optical communication links are used between servers and leaf switches, and also between leaf switches and spine switches, and PAM utilized for optical network communication.

Figure 2:
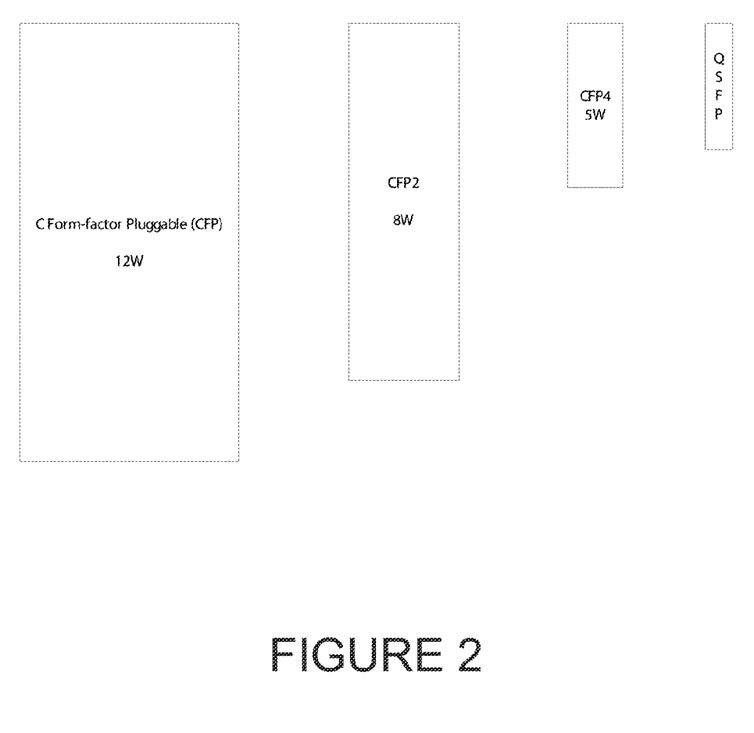
FIG. 2 is a simplified diagram illustrating the form factor of a communication device according to an embodiment of the present invention.

It is to be appreciated that the PAM communication interfaces described above can be implemented in accordance with today communication standards form factors. In addition, afforded by high efficiency level, network transceivers according to embodiments of the present invention can have much lower power consumption and smaller form factor compared to conventional devices. FIG. 2 is a simplified diagram illustrating the form factor of a communication device according to an embodiment of the present invention. Today, C form-factor pluggable (CFP) standard is widely adapted for gigabit network systems. Conventional electrical-connection based CFP transceivers often use 10×10 gigabits/s lines to achieve high bandwidth. With optical connection, CFP transceivers can utilize 10×10 gigabits/s configuration, 4×25 gigabits/s configuration, or others. It is to be appreciated that by utilizing optical communication link and PAM format, a transceiver according to the present invention can have a much smaller form factor than CFP and CFP2 as shown. In various embodiments, communication interfaces according to the invention can have a form factor of CFP4 or QSFP, which are much smaller in size than the CFP. In addition to smaller form factors, the power consumption of communication interfaces according to the present invention can be much smaller. In a specific embodiment, with the form factor of QSFP, the power consumption can be as low as about 3W, which is about ¼ that of convention transceivers with CFP form factor. The reduce level of power consumption helps save energy at data centers, where thousands (sometimes millions) of these communication devices are deployed.

Figure 3A:
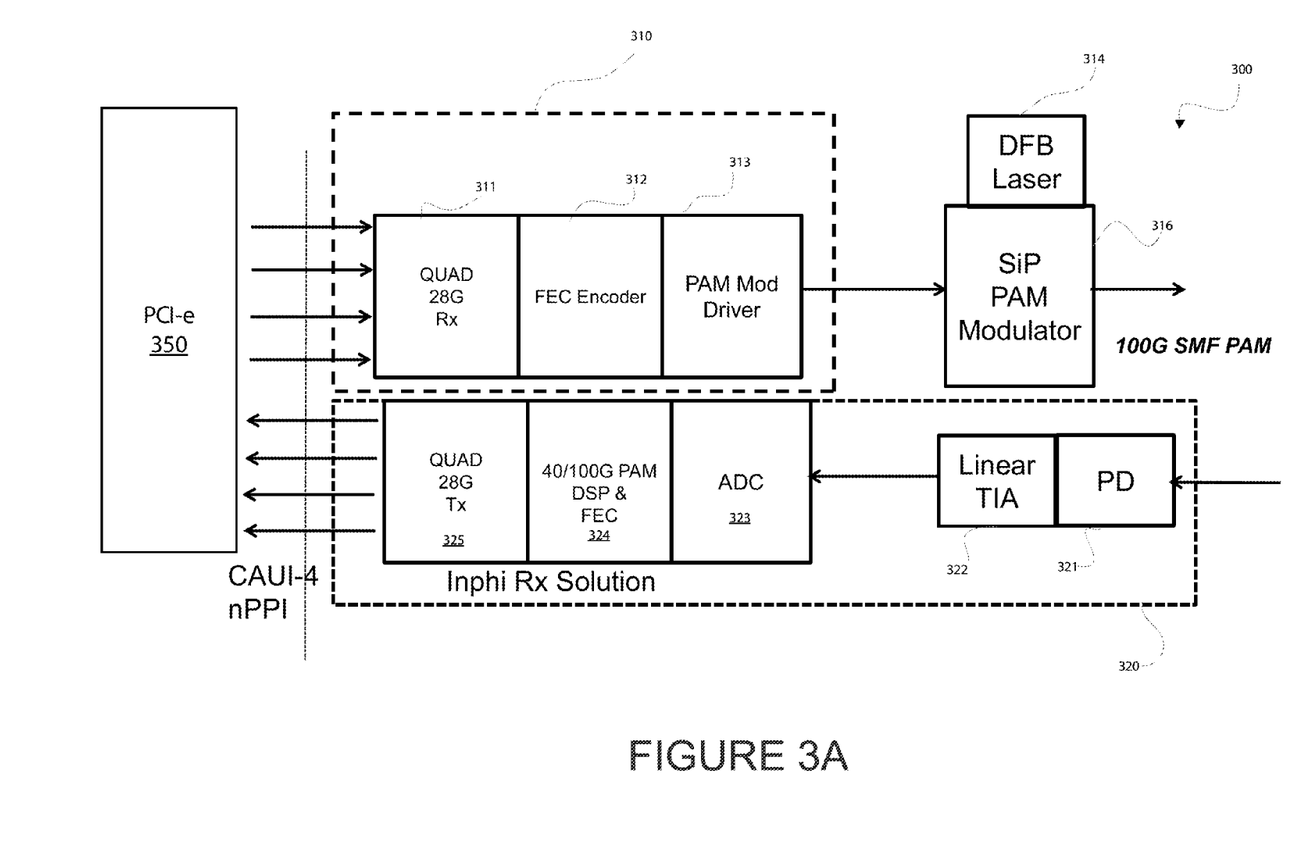
FIG. 3A is a simplified diagram illustrating a communication interface according to an embodiment of the present invention.

FIG. 3A is a simplified diagram illustrating a communication interface 300 according to an embodiment of the present invention. This diagram is merely an example, which should not unduly limit the scope of the claims. One of ordinary skill in the art would recognize many variations, alternatives, and modifications. The communication interface 300 includes transmitter module 310 and a receiver module 320. The transmitter module 310 comprises a receiver 311, encoder 312, and PAM modulation driver 313.

In an embodiment, the communication interface 300 is configured to receive incoming data at through four channels, where each channel is configured at 25 gigabits/s and configured as a PAM-2 format. Using the transmitter module 310, modulator 316, and the laser 314, the communication interface 300 processes data received at 25 gigabits/s from each of the four incoming channels, and transmits PAM modulated optical data stream at a bandwidth of 100 gigabits/s. It is to be appreciated that other bandwidths are possible as well, such as 40 Gbps, 400 Gbps, and/or others.

As shown the transmitter module 310 receives 4 channels of data. It is to be appreciated that other variants of pulse-amplitude modulation (e.g, PAM4, PAM8, PAM12, PAM16, etc), in addition to PAM-2 format, may be used as well. The transmitter module 310 comprises functional block 311, which includes a clock data recovery (CDR) circuit configured to receive the incoming data from the four communication channels. In various embodiments, the functional block 311 further comprises multiplexer for combining 4 channels for data. For example, data from the 4 channels as shown are from the PCE-e interface 350. For example, the interface 350 is connected to one or more processors. In a specific embodiment, two 2:1 multiplexers are employed in the functional block 311. For example, the data received from the four channels are high-speed data streams that are not accompanied by clock signals. The receiver 311 comprises, among other things, a clock signal that is associated with a predetermined frequency reference value. In various embodiments, the receiver 311 is configured to utilize a phase-locked loop (PLL) to align the received data.

The transmitter module 310 further comprises an encoder 312. As shown in FIG. 3, the encoder 312 comprises a forward error correction (FEC) encoder. Among other things, the encoder 312 provides error detection and/or correction as needed. For example, the data received is in a PAM-2 format as described above. The received data comprises redundancy (e.g., one or more redundant bits) helps the encoder 312 to detect errors. In a specific embodiment, low-density parity check (LDPC) codes are used. The encoder 312 is configured to encode data received from four channels as shown to generate a data stream that can be transmitted through optical communication link at a bandwidth 100 gigabits/s (e.g., combining 4 channels of 25 gigabits/s data). For example, each received is in the PAM-2 format, and the encoded data stream is a combination of four data channels and is in PAM-8 format. Data encoding and error correction are used under PAM format. The PAM formats as used in the embodiments of the present invention are further described below.

The PAM modulation driver 313 is configured to drive data stream encoded by the encoder 312. In various embodiments, the receiver 311, encoder 312, and the modulation driver 313 are integrated and part of the transmitter module 310.

The PAM modulator 316 is configured to modulate signals from the transmitter module 310, and convert the received electrical signal to optical signal using the laser 314. For example, the modulator 316 generates optical signals at a transmission rate of 100 gigabits per second. It is to be appreciated that other rate are possible as well, such as 40 Gbps, 400 Gbps, or others. The optical signals are transmitted in a PAM format (e.g., PAM-8 format, PAM12, PAM 16, etc.). In various embodiments, the laser 314 comprises a distributed feedback (DFB) laser. Depending on the application, other types of laser technology may be used as well, as such vertical cavity surface emitting laser (VCSEL) and others.

Figure 3B:
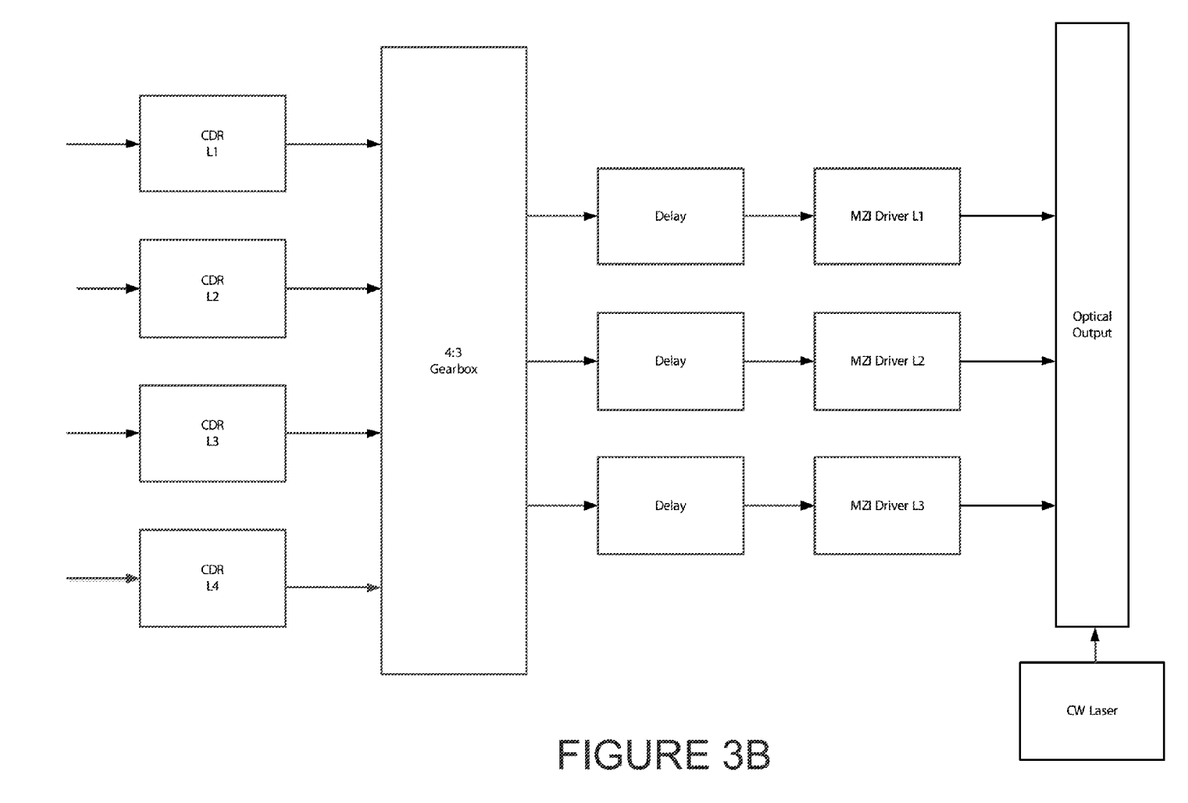
FIG. 3B is a simplified diagram illustrating a segmented optical modulator according to an embodiment of the present invention.

FIG. 3B is a simplified diagram illustrating a segmented optical modulator according to an embodiment of the present invention. This diagram is merely an example, which should not unduly limit the scope of the claims. One of ordinary skill in the art would recognize many variations, alternatives, and modifications. For example, modulated PAM signals modulated for transmission over optical communication links.

Now referring back to FIG. 3A. The communication interface 300 is configured for both receiving and transmitting signals. A receiver module 320 comprise a photo detector 321 that converts incoming data signal in an optical format converts the optical signal to an electrical signal. In various embodiments, the photo detector 321 comprises indium gallium arsenide material. For example, the photo detector 321 can be a semiconductor-based photodiode, such as p-n photodiodes, p-i-n photodiodes, avalanche photodiodes, or others. The photo detector 321 is coupled with an amplifier 322. In various embodiments, the amplifier comprises a linear transimpedance amplifier (TIA). It is to be appreciated by using TIA, long-range multi-mode (LRM) at high bandwidth (e.g., 100 Gb/s or even larger) can be supposed. For example, the TIA helps compensate for optical dispersion in electrical domain using electrical dispersion compensation (EDC). In certain embodiments, the amplifier 322 also includes a limiting amplifier. The amplifier 322 is used to produce a signal in the electrical domain from the incoming optical signal. In certain embodiments, further signal processing such as clock recovery from data (CDR) performed by a phase-locked loop may also be applied before the data is passed on.

The amplified data signal from the amplifier 322 is processed by the analog to digital converter (ADC) 323. In a specific embodiment, the ADC 323 can be a baud rate ADC. For example, the ADC is configured to convert the amplified signal into a digital signal formatted into a 100 gigabit per second signal in a PAM format. The functional block 324 is configured to process the 100 Gb/s data stream and encode it into four at streams at 25 Gb/s each. For example, the incoming optical data stream received by the photo detector 321 is in PAM-8 format at a bandwidth of 100 Gb/s, and at block 324 four data streams in PAM-2 format is generated at a bandwidth of 25 Gb/s. The four data streams are transmitted by the transmitter 325 over 4 communication channels at 25 Gb/s.

It is to be appreciated that there can be many variations to the embodiments described in FIG. 3. For example, different number of channels (e.g., 4, 8, 16, etc.) and different bandwidth (e.g., 10 Gb/s, 40 Gb/s, 100 Gb/s, 400 Gb/s, 3.2 Tb/s, etc.) can be used as well, depending on the application (e.g., server, leaf switch, spine switch, etc.).

In an embodiment, the present invention provides a driver device for and optical modulator device. The present driver is used for optical communications links. It produces the electrical signal that drives the optical modulator device. The optical modulator transfers variations of the electrical signal into corresponding modulation of an optical signal parameter such as amplitude, phase, polarization or a combination of these, in order to convey information on an optical wave such as one traveling through an optical fiber. The electrical "modulator driver" circuit is an important electronic component since all of the data to be conveyed optically has to pass through this electrical device, which typically requires it to operate at the highest speed or data rate of any electrical component in the communication system. In addition, the driver must produce an electrical amplitude that is typically large relative to other data signals in the system, due to the weakness of the electro-optical effects that are used in high-speed optical modulators. This makes the modulator driver a major contributor to power dissipation in the system, and puts a premium on techniques to reduce this power. FIGS. 4-7 describe some conventional modulators for reference.

Figure 4:
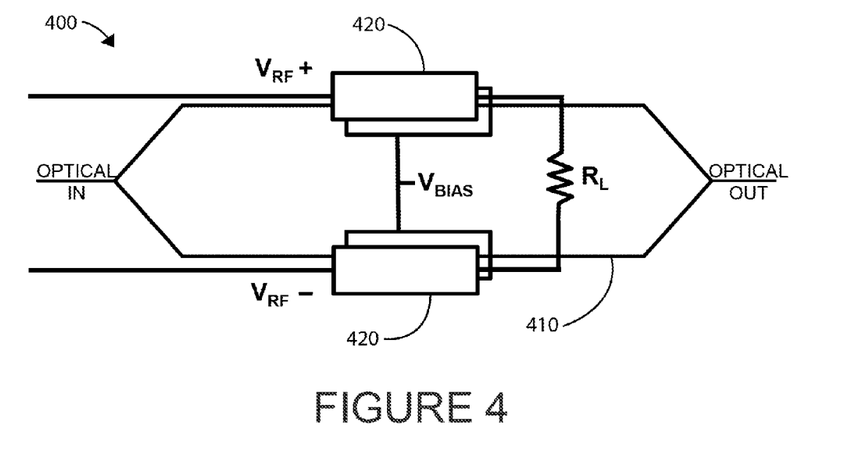
FIG. 4 is simplified diagram of a conventional differential or dual-drive modulator.

FIG. 4 is simplified diagram of a conventional differential or dual-drive modulator. As shown, device 400 includes an optical waveguide 410 and signal conductor electrodes 420 connected to electrical transmission lines. The upper rectangle shown is one signal conductor electrode and the lower rectangle is a similar electrode that is for return path for this current. The electric field from this electrical "RF" signal is concentrated between these plates or conductors 420, where it interacts on the optical waveguide 410 to produce the modulation effect in the modulator material where the "RF" and optical fields overlap. In this case, the electric field exists between the signal + and signal − electrodes, hence a "differential" structure.

Figure 5:
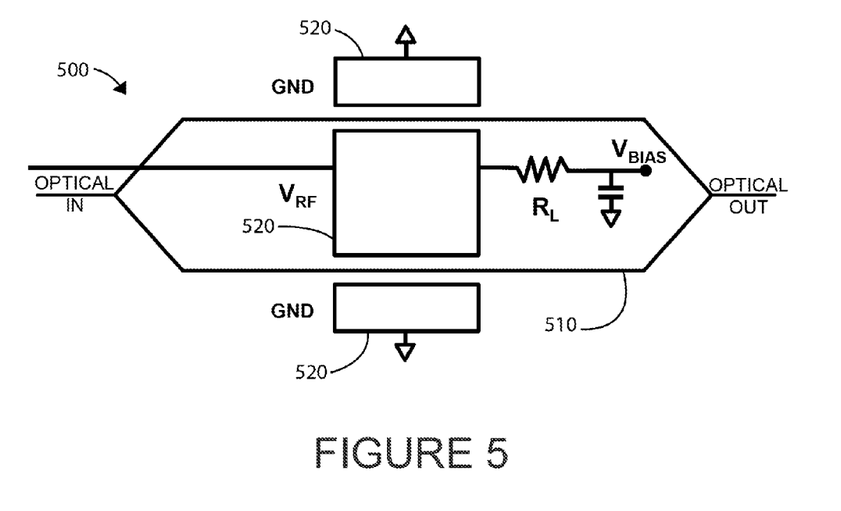
FIG. 5 is a simplified diagram of a conventional single-ended modulator.

FIG. 5 is a simplified diagram of a conventional single-ended modulator. As shown, device 500 includes an optical waveguide 510 and signal conductor electrodes 520 connected to electrical transmission lines. Similar to device 400 of FIG. 4, the electric field from this electrical "RF" signal is concentrated between these plates or conductors 420, where it interacts on the optical waveguide 410 to produce the modulation effect in the modulator material where the "RF" and optical fields overlap. This device 500 shows a modulator with a horizontal "CPW" transmission line compared to the modulator with vertical "coplanar strips" as shown in FIG. 4. In this case, the electric field exists between the signal electrode and ground for the "single-ended" structure.

Figure 6:
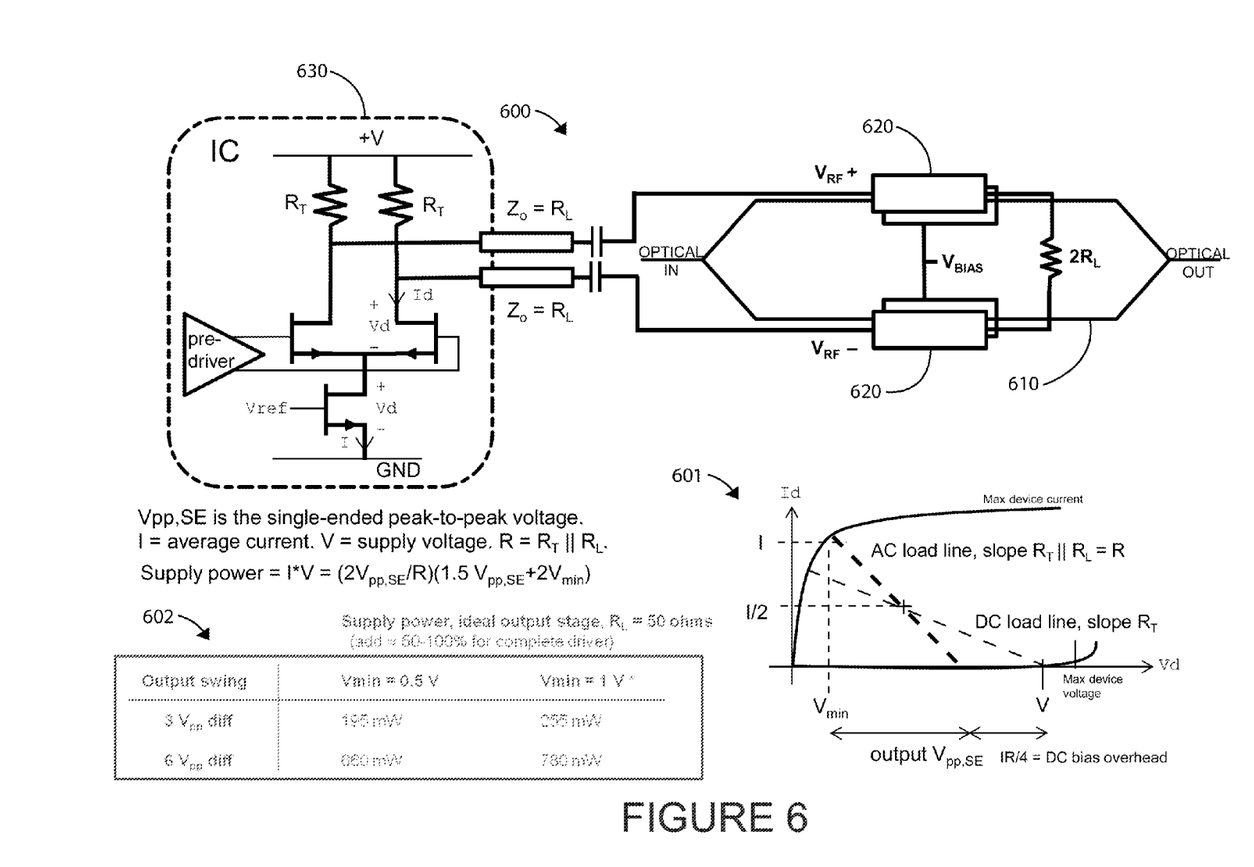
FIG. 6 is a simplified diagram of a conventional differential AC coupled modulator.

FIG. 6 is a simplified diagram of a conventional differential AC coupled modulator. As shown, device 600 includes an optical waveguide 610 and signal conductor electrodes 620 connected to electrical transmission lines and a driver circuit device 630. The modulator of device 600 is a differential modulator, similar to device 400 of FIG. 4, which is AC coupled. A disadvantage of this configuration is that with the driver being coupled to the modulator or MZM, the driver requires a back termination at the driver to absorb reflections from interconnect and bias elements. Transmission line interconnects and DC blocking capacitors are needed. These all contribute to a larger structure that is inefficient in power and size due to conventional design barriers (standardization forces a 50-ohm transmission line interface with no DC interaction allowed). Here, the differential modulator is coupled to a differential operational amplifier driver circuit device 630.

Graph 601 shows a current-voltage characteristic graph for the device 600. Both the AC load line and DC load lines are shown. As shown in FIG. 6, $V_{pp,SE}$ is the single-ended peak-to-peak voltage, I is the average current, V is the supply voltage, and the R is resistance. Table 602 shows a comparison of supply power values (Supply power=I*V=(2$V_{pp,SE}$/R) (1.5$V_{pp,SE}$+2$V_{min}$)) given different output swing values and minimum voltage values.

Figure 7:
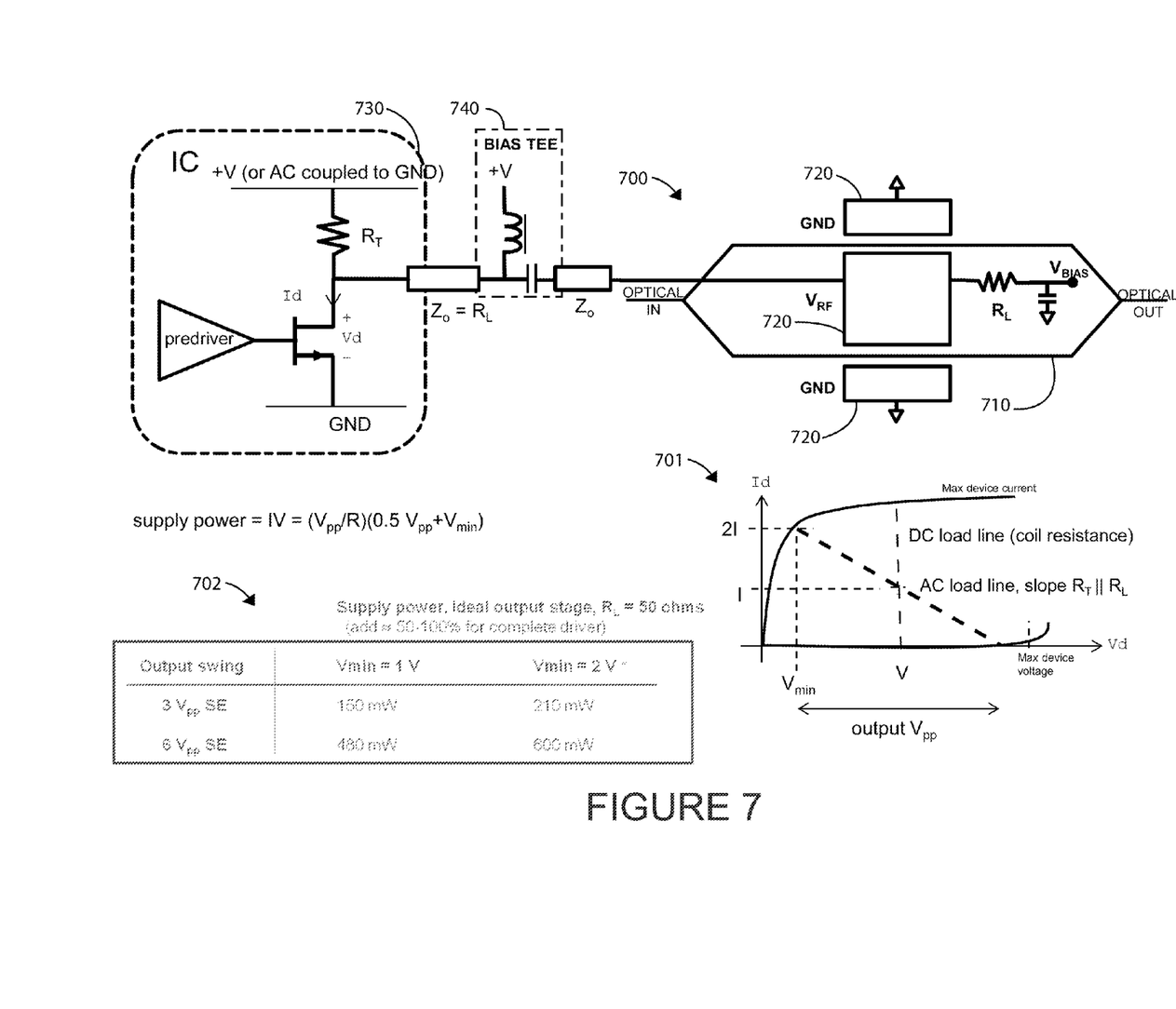
FIG. 7 is a simplified diagram of a conventional single ended modulator with bias tee.

FIG. 7 is a simplified diagram of a conventional single ended modulator with bias tee. As shown, device 700 includes an optical waveguide 710 and signal conductor electrodes 720 connected to electrical transmission lines, a driver circuit device 730, and a bias tee 740. The modulator of device 700 is a single ended modulator, similar to device 500 of FIG. 5. A disadvantage of this configuration is that with the driver being coupled to the modulator or MZM, the driver requires a back termination at the driver to absorb reflections from interconnect and bias elements. Transmission line interconnects and inductor/capacitor bias-tees are needed. These all contribute to a larger structure that is inefficient in power and size due to conventional design barriers (standardization forces a 50-ohm transmission line interface with no DC interaction allowed). Here, the single ended modulator is coupled to a single ended amplifier driver circuit device 730.

Graph 701 shows a current-voltage characteristic graph for the device 700. Both the AC load line and DC load lines are shown. Table 602 shows a comparison of supply power values (Supply power=I*V=($V_{pp}$/R)(0.5$V_{pp}$+$V_{min}$)) given different output swing values and minimum voltage values.

Figure 8:
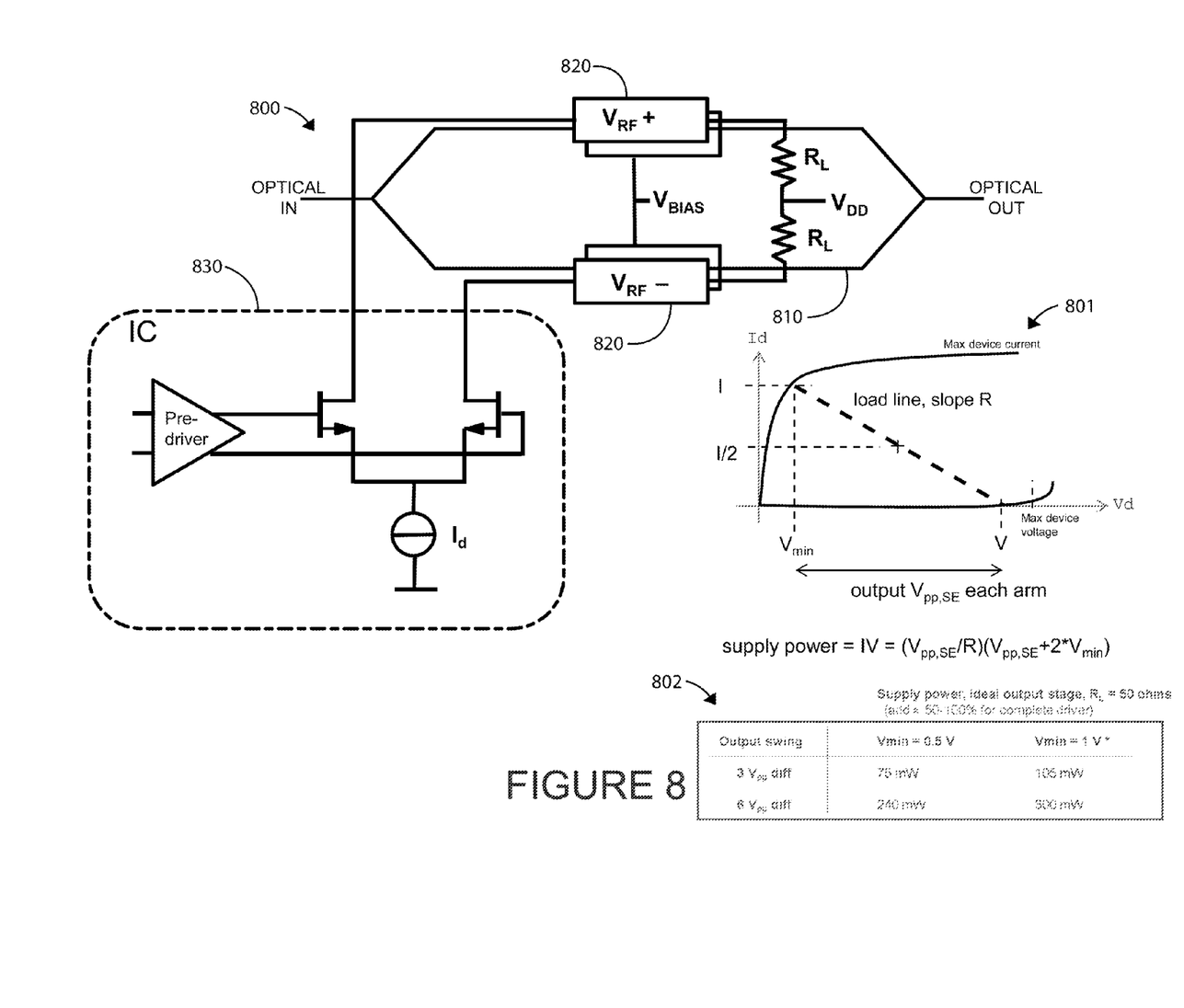
FIG. 8 is a simplified diagram of a direct coupled modulator according to an embodiment of the present invention.

FIG. 8 is a simplified diagram of a direct coupled modulator according to an embodiment of the present invention. As shown, device 800 includes an optical waveguide 810 and signal conductor electrodes 820 connected to electrical transmission lines and a driver circuit device 830. The signal conductor electrodes 820 can form a microstrip line, a coplanar waveguide (CPW), parallel plates, or some other transmission line, or the like. The electric field from this electrical "RF" signal is concentrated between these plates, where it interacts on the optical waveguide (shown in dotted lines) to produce the modulation effect in the modulator material where the "RF" and optical fields overlap. The modulator of device 800 is a differential modulator, similar to device 400 of FIG. 4.

FIG. 8 shows an embodiment of the present invention. One difference in device 800 compared to the previous figures is that there is no back-termination $R_T$. Therefore, the load R seen by the driver is just the load resistance $R_L$. $R_L$ serves the same function in all examples: it is the termination to the transmission lines inside the optical modulator. The back-termination is generally used so that the driver has a good impedance match to a 50 ohm line, which is the usual way of connecting a driver and a modulator since they are traditionally designed as separate items. However, the line between them may be long, multi-sectioned, or involve vias or connectors, etc., all of which can add reflections. If the driver does not have a back termination, these reflections can bounce back and degrade the signal. If the driver is designed to be interfaced directly to the modulator, as shown here, this problem can be eliminated; the modulator termination/load resistor may also be used as an input point for the driver power supply ($V_{DD}$), as shown in FIG. 8.

Graph 801 shows a current-voltage characteristic graph for the device 800. Both the AC load line and DC load lines are shown. Table 802 shows a comparison of supply power values (Supply power=I*V=(2$V_{pp,SE}$/R)(1.5$V_{pp,SE}$+2$V_{min}$)) given different output swing values and minimum voltage values.

It is to be appreciated that embodiments of the present invention provide numerous benefits and advantages over existing techniques. In an embodiment, the electrical driver is directly coupled to the modulator device or MZM, which can include a wire-bonded or flip-chipped application directly to a photonic circuit without transmission line interconnects. The driver can receive its power supply for the output stage through the modulator termination resistors. This configuration can eliminate the need for back termination at the driver, which saves power (e.g. >40%). Also, the need for bias tees or DC blocks between driver and modulator can be eliminated, which saves area (e.g. >100%). Furthermore, this configuration can allow a versatile drive capability, since the exact impedance of the modulator load is not critical to signal quality. The DC bias of the modulator can also be configured with a bias control loop. There are many other benefits as well.

Figure 9:
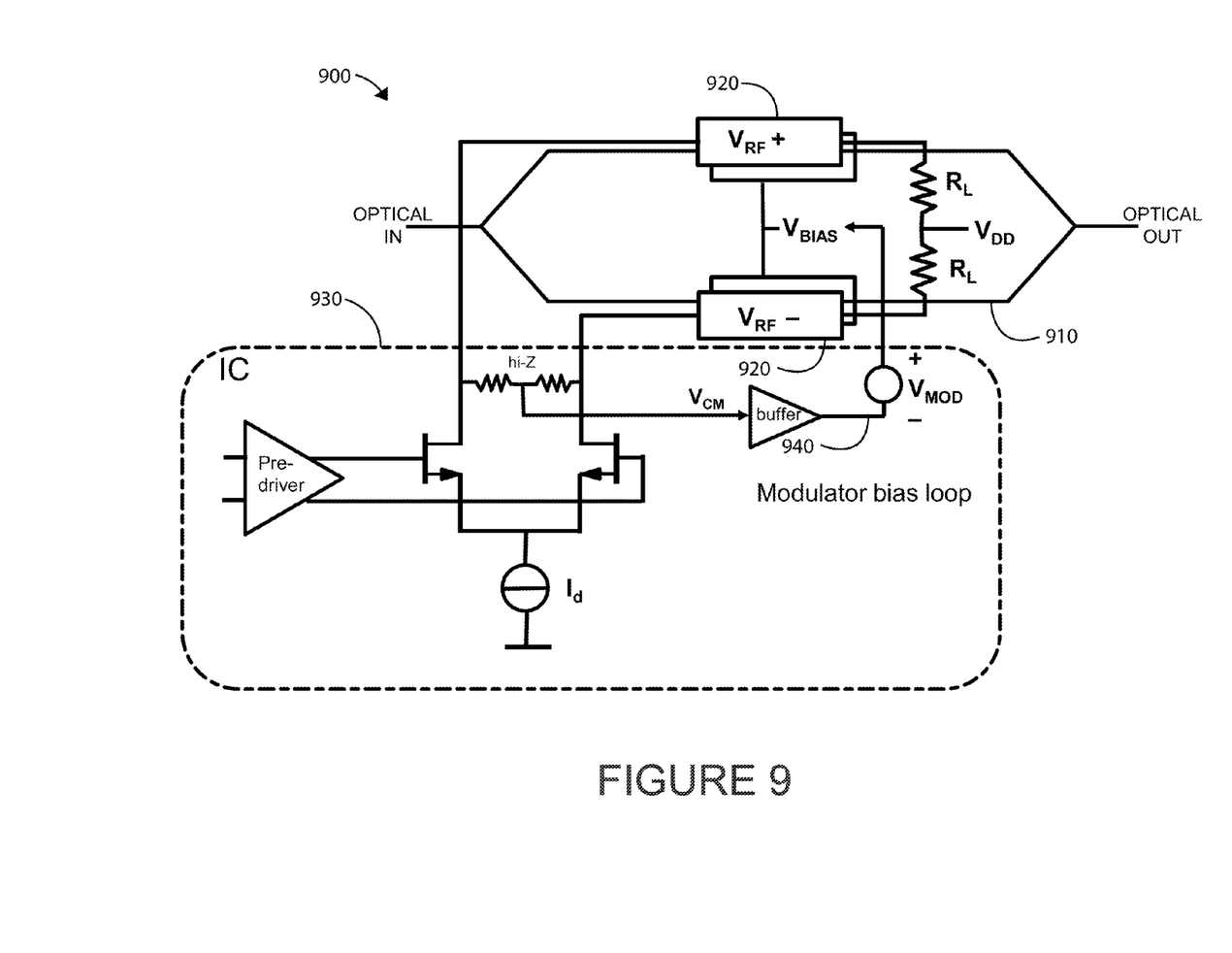
FIG. 9 is a simplified diagram of a direct coupled modulator according to an embodiment of the present invention.

FIG. 9 is a simplified diagram of a direct coupled modulator according to an embodiment of the present invention. As shown, device 900 includes an optical waveguide 910 and signal conductor electrodes 920 connected to electrical transmission lines and a driver circuit device 930, which can have a modulator bias loop 940. A simplified schematic which illustrates the basic functioning of a bias control loop is shown in FIG. 9. The goal of the bias control loop is to keep a DC voltage equal to $V_{MOD}$ applied across the modulator electrodes at all times. This is useful in semiconductor-based MZ modulators in which the electro-optic modulation effect occurs or is maximized at a specific DC bias; for example, where the electrode comprises a reverse-biased diode. The $V_{MOD}$ voltage is the resulting DC voltage across each electrode For the typical case of a DC-balanced data signal, $V_{MOD}$ can be considered to be the average DC voltage on Vrf+ and Vrf− (e.g. the common-mode voltage at the driver output terminals) minus the DC voltage on the opposite terminals of these respective MZM electrodes. So, as the DC voltages at the Vrf+ and Vrf− pads vary due to supply voltage $V_{DD}$ changing, or drive current changing, etc., the control loop keeps the DC voltage across the electrodes constant. Thus, $V_{MOD}$ serves as the bias point for the optical modulator function, with the AC modulation voltage riding on top. In practice there are a number of op-amp circuits that would perforin this function.

In an embodiment, the present invention provides an optical modulator device directly-coupled to a driver circuit device. The optical modulator device can include a transmission line electrically coupled to an internal VDD, a first electrode electrically coupled to the transmission line, a second electrode electrically coupled to the first electrode and the transmission line. A wave guide can be operably coupled to the first and second electrodes, which can be reverse-biased diodes and the like. The transmission line and the first and second electrodes can be configured as a microstrip line, a coplanar waveguide (CPW), or a parallel plate transmission line, or the like. A driver circuit device can be directly coupled to the transmission line and the first and second electrodes. This optical modulator and the driver circuit device can be configured without back termination. The optical modulator can be a Mach-Zehnder Modulator (MZM).

In a specific embodiment, the driver circuit device can include a driver op-amp circuit electrically coupled to the transmission line, and a bias loop circuit electrically coupled to the first and second electrodes and the driver op-amp circuit. The bias loop circuit device can include a buffer op-amp, a voltage sources, and a high impedance node. The buffer op-amp can be electrically coupled to the voltage source and the high impedance node. The high impedance node can be electrically coupled to the driver op-amp circuit and the transmission line. The voltage source can be electrically coupled to the first and second electrodes, and can be configured to provide the electrodes with a bias voltage.

In a specific embodiment, this optical modulator directly coupled to a driver circuit device can be provided within an optical network system. This system can include a receiver device configured to receive four communication channels. Each of the channels can be capable of transferring incoming data at 25 GPS. The system can also include a clock data recovery circuit configured to receive the incoming data from the four communication channels. An encoder can be provided to format the incoming data from these four channels. The driver circuit device can be configured to drive the encoded incoming data, and the modulator can include a PAM modulator configured for receiving the encoded incoming data and transferring an outgoing signal at a rate of at least 40 Gbps per second using a PAM form with the incoming data being configured as a PAM-2 format.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical modulator device comprising:
a transmission line electrically coupled to an internal VDD;
a first electrode electrically coupled to the transmission line;
a second electrode electrically coupled to the first electrode and the transmission line;
a wave guide operably coupled to the first and second electrodes; and
a driver circuit device directly coupled to the transmission line and the first and second electrodes.

2. The device of claim 1 wherein the driver circuit device comprises a driver op-amp circuit electrically coupled the transmission line, and a bias loop circuit electrically coupled to the first and second electrodes and the driver op-amp circuit.

3. The device of claim 2 wherein the bias loop circuit device comprises a buffer op-amp, a voltage source, and a high impedance node, wherein the buffer op-amp is electrically coupled to the voltage source and the high impedance node, the high impedance node being electrically coupled to the driver op-amp circuit and the transmission line, the voltage source being electrically coupled to the first and second electrodes.

4. The device of claim 1 wherein the optical modular device and the driver circuit device are configured without back termination.

5. The device of claim 1 wherein the optical modulator device comprises a Mach-Zehnder Modulator (MZM).

6. The device of claim 1 wherein the first and second electrodes comprise reverse-biased diodes.

7. The device of claim 1 wherein the transmission line and the first and second electrodes are configured as a microstrip line, a coplanar waveguide (CPW), or a parallel plate transmission line.

8. An optical modulator device directly-coupled to a driver circuit device, the driver circuit device comprising:
a driver op-amp circuit directly-coupled to the optical modulator device; and
a bias control loop circuit coupled to the driver op-amp circuit and the optical modulator device, the bias control loop circuit including a buffer op-amp, a voltage source, and a high impedance node.

9. The device of claim 8 wherein the buffer op-amp is electrically coupled to the voltage source and the high impedance node, the high impedance node being electrically coupled to the driver op-amp circuit and the optical modulator, the voltage source being electrically coupled the optical modulator.

10. The device of claim 8 wherein the optical modulator device and the driver circuit device are configured without back termination.

11. The device of claim 8 wherein the optical modulator device comprises a differential modulator device, a single ended modulator device, or a Mach-Zehnder modulator (MZM) device.

12. The device of claim 8 wherein the optical modulator device comprises a pair of modulator electrodes, and wherein bias control loop circuit is configured to provide a bias voltage to the modulator electrodes.

13. An optical network system comprising:
a receiver device configured to receive four communication channels, each of the channels being capable of transferring incoming data at 25 GPS;
a clock data recovery circuit configured to receive the incoming data from the four communication channels;
an encoder to format the incoming data from the four channel communications;
an optical modulator device comprising
a transmission line electrically coupled to an internal VDD,
a first electrode electrically coupled to the transmission line,
a second electrode electrically coupled to the first electrode and the transmission line, and
a wave guide operably coupled to the first and second electrodes; and
a driver circuit device directly coupled to the transmission line and the first and second electrodes, the driver device being configured to drive the encoded incoming data.

14. The system of claim 13 wherein the driver circuit comprises
a driver op-amp circuit electrically coupled to the transmission line, and
a bias loop circuit electrically coupled to the first and second electrodes and the driver op-amp circuit.

15. The system of claim 14 wherein the bias loop circuit device comprises
a high impedance node electrically coupled to the driver op-amp circuit and the transmission line,
a buffer op-amp electrically coupled to the high impedance node, and
a voltage source being electrically coupled to the first and second electrodes and the buffer op-amp.

16. The system of claim 13 wherein the optical modular device and the driver circuit device are configured without back termination.

17. The system of claim 13 wherein the optical modulator device comprises a Mach-Zehnder Modulator (MZM).

18. The system of claim 13 wherein the first and second electrodes comprise reverse-biased diodes.

19. The system of claim 13 wherein the transmission line and the first and second electrodes are configured as a microstrip line, a coplanar waveguide (CPW), or a parallel plate transmission line.

20. The system of claim 13 wherein the optical modulator device comprises a PAM modulator configured to receiving the encoded incoming data and transferring an outgoing signal at a rate of at least 40 Gbps per second using a PAM form, the incoming data being configured as a PAM-2 format.

* * * * *